United States Patent [19]

Bekedam

[11] Patent Number: 4,698,076
[45] Date of Patent: Oct. 6, 1987

[54] ATMOSPHERIC DEAERATOR UNIT

[76] Inventor: Martin Bekedam, 103 Brookline, Moraga, Calif. 94556

[21] Appl. No.: 851,965

[22] Filed: Apr. 14, 1986

[51] Int. Cl.$^4$ .............................................. B01D 19/00
[52] U.S. Cl. .......................................... 55/164; 55/39; 55/41; 55/196; 55/201
[58] Field of Search ...................... 55/39, 41, 164, 196, 55/201, 217

[56]  References Cited

U.S. PATENT DOCUMENTS

| 2,671,524 | 3/1954 | Gilwood | 55/39 |
| 2,689,018 | 9/1954 | Kittredge | 55/39 |
| 3,487,611 | 1/1970 | Bekedam | 55/39 X |
| 4,385,908 | 5/1983 | Carmichael | 55/39 |
| 4,445,537 | 5/1984 | Athey et al. | 55/39 |

FOREIGN PATENT DOCUMENTS

| 28664 | 5/1981 | European Pat. Off. | 55/201 |
| 932054 | 7/1963 | United Kingdom | 55/39 |

OTHER PUBLICATIONS

SR.03 Deaerator, 3.2, Industrial Steam, Inc., 4 page brochure, Jul. 1976.
.005 Pressurized Jet Spray Deaerator 2.2, Kewanee Boiler Corporation, 6 page brochure, Bulletin 2.2-3/84.
.03 Spray Flow Deaerator 3.1, Industrial Steam, 4 page brochure, Apr. 1979.
.005 Pressurized Steam Flow Deaerator 2.1, Industrial Steam, 4 page brochure, Apr. 1979.
.005 Spray Flow Deaerator 4.1, Industrial Steam, 4 page brochure, May 1977.

*Primary Examiner*—Robert Spitzer
*Attorney, Agent, or Firm*—Bielen and Peterson

[57] ABSTRACT

An atmospheric deaerator unit for use in combination with a deaerator receiver in a boiler feedwater system the deaerator unit being constructed with a container having a steam inlet, a makeup and circulating water inlet and a vapor passage interconnection to the deaerator receiver which stores deaerated water for cycling to a boiler, the container having an open atmospheric vent and enclosing a shrouded water spray valve at the end of the water inlet, a water collection tray under the spray valve, and a steam dispersion valve, the tray having an overflow around the end of the steam inlet within the container, wherein water cascades to the steam dispersion valve and is atomized and fully deaerated, the deaerated water falling through the vapor passage interconnection for collection in the deaerator receiver, wherein the steam dispersion valve is regulated by a thermostatic control having a temperature sensor submersed in the water of the collection tray.

13 Claims, 4 Drawing Figures

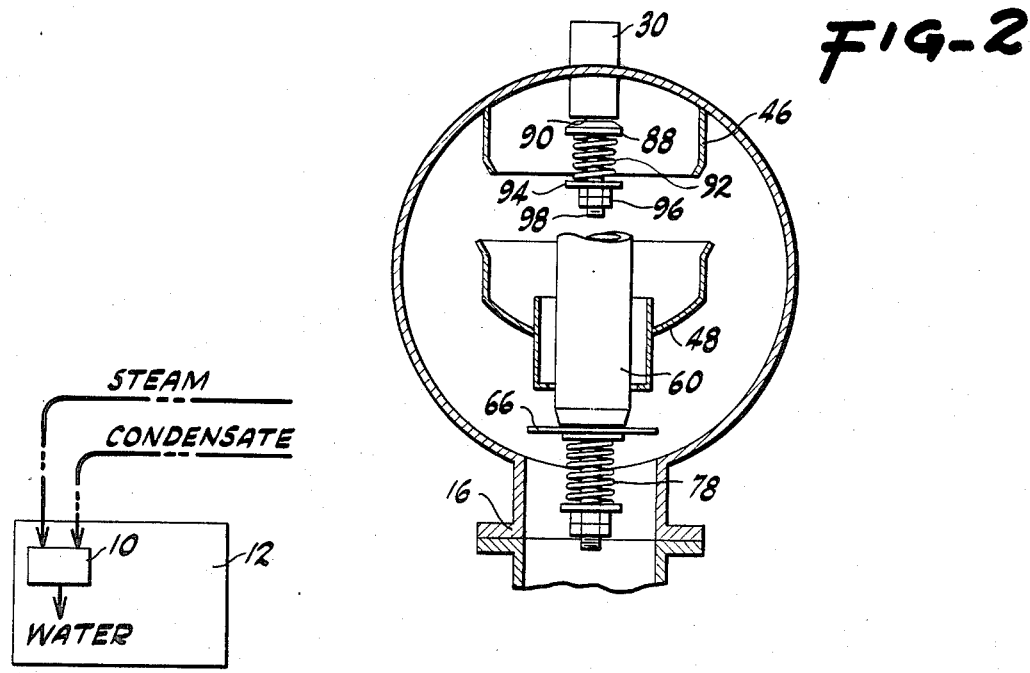
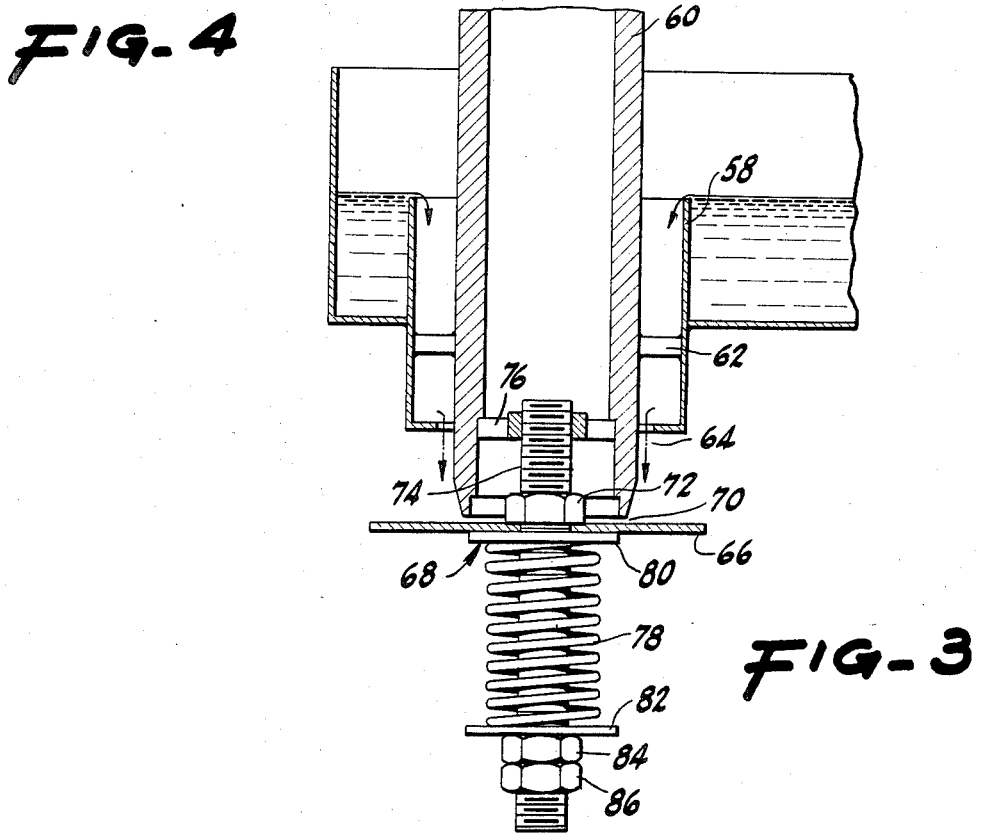

ATMOSPHERIC DEAERATOR UNIT

BACKGROUND OF THE INVENTION

The invention relates to a deaeration system for deaerating boiler feed water. In the continuous operation of a boiler, particularly an industrial boiler where steam losses in processing operations occur, it is necessary to deaerate the boiler feedwater which is comprised of steam condensate and makeup water. Oxygen in feedwater delivered to a boiler can cause corrosion and tube failure. In addition to oxygen, carbon dioxide, which is corrosive under high temperatures, must be continuously removed as it is not only present in makeup water, but is produced from the breakdown of bicarbonates in the boiler water.

Deaerators are rated as either 0.03 cc/liter or 0.005 cc/liter, the latter being by far the most effective. The rating indicates the maximum quantity of air remaining in the water after treatment. The 0.005 cc/liter units are used for higher pressure boilers usually over 50 p.s.i. since pressure accelerates corrosion.

Deaerators are classified as atmospheric or pressurized depending on whether the deaerator tank is under pressure. Usually a pressurized deaerator is required to maintain the 0.005 cc/liter standard. An atmospheric deaerator which is vented directly to air is less costly, easier to maintain and safer even though operating pressures in a pressurized deaerator are moderately low.

Certain high performance atmospheric deaerators have been devised with a pressurized water circuit for superheated scrubbing water. The deaerator includes a deaerating section and scrubbing section in a divided tank system. The circulating scrubbing water is superheated in a heat exchanger and sprayed into a scrubbing section of the divided tank where the water flashes any remaining non-condensible gases. High performance systems, such as the Spray Flow Deaerator 4.1 of Industrial Steam as described in my U.S. Pat. No. 3,487,611, issued Jan. 29, 1968 are complex units requiring a high volume of cycling such that the flash steam is sufficient to compensate for surges in low temperature makeup water. Unless properly controlled such deaerating condensers are variable in performance. Additionally, to assure proper atmospheric venting of non-condensible gases, a steam loss is required for the purging process. While the prior art system is suitable where variations in makeup water are minimal to moderate, the system is inconsistent for variations often encountered in boiler systems used for processing equipment. In such applications, return condensate will vary in temperature and volume. such variations will induce surges in makeup water. Since enough steam from the flashed water from the heat exchanger is not available at all times to heat the new makeup water as it enters through the internal vent condenser, the water is inadequately deaerated. In extreme cases, the flashed steam will condense more than desired, drawing air through the vent. For this reason atmospheric deaerators, usually have a protective lining to prevent corrosion.

The deaerator unit of this invention solves many of the problems of a deaerator utilizing a deaerating condenser without a heater in an energy efficient manner.

SUMMARY OF THE INVENTION

This invention relates to a deaerator unit for removing oxygen and other non-condensible gases from boiler feedwater. The deaerator unit is preferably an add-on component to a receiver tank but may be incorporated within a receiver tank if desired.

The deaerator unit is particularly devised for use in an atmospheric deaerator system and is constructed to effectively scrub and deaerate circulated condensate and makeup water in a compact unit. The unit is constructed with a water spray condenser proximate an atmospheric vent in combination with a steam exploder that blasts collected spray into a mist. The operation of the spray condenser and steam exploder is thermostatically controlled by a spray collection tray with thermostat that regulates steam flow in the steam exploder. In operation, the water spray is heated by the released steam condensing the steam and scrubbing air from the spray. Under the spray is a collection tray for temporarily holding the sprayed water and monitoring its temperature. Overflow from the tray cascades to the dispersion plate of a steam dispersion valve. The volume of steam flowing from the valve, which heats and explodes the water, is regulated by a steam line control valve according to temperature monitored by the submersed thermostat. The tray water is maintained at 210° F. to 211° F., just below the vaporization temperature. As the temperature falls, for example during a surge of colder makeup water, it is immediately sensed and steam flow is increased. The increased steam flow is condensed by the water spray raising the spray temperature and attenuating the temperature fluctuation of the collection tray water. As the preferred embodiment is constructed to cascade the water around the steam outlet before the water hits the dispersion plate, any remaining differential in temperature from the preferred norm is eliminated by the increased flow of steam through the outlet which heats the fixture. The increased flow of steam explodes the water which reaches a temperature parity with the water mist. The increased volume of steam that is not condensed by the water spray in the condenser section is condensed in a vent condenser to eliminate losses.

The preferred embodiment of the deaerator unit is in the form of a small, add-on component to a receiver into which the condensed, deaerated water collects. If desired the deaerator unit can be incorporated within the deaerator vessel proximate the atmospheric vent. The deaerator unit may be used in a 0.005 cc/liter deaerator or a 0.03 cc/liter deaerator, commonly called a deaerating heater.

Because of its quick response to changes in the temperature of incoming condensate and makeup water mixtures, the deaeration unit is ideal for use in boiler systems for industrial processing. These and other features will become apparent on consideration of the detailed description of the preferred embodiment.

DESCRIPTION OF THE DRAWINGS

FIG. 2 is a cross sectional view of the deaerator unit taken on the lines 2—2 in FIG. 1.

FIG. 3 is a an enlarged, cross sectional view of a component of FIG. 2.

FIG. 4 is a schematic view of an alternate arrangement of the deaerator unit and receiver.

DETAILED DESCRIPTION OF THE PREFERRED EMBODIMENTS

Figure 1:
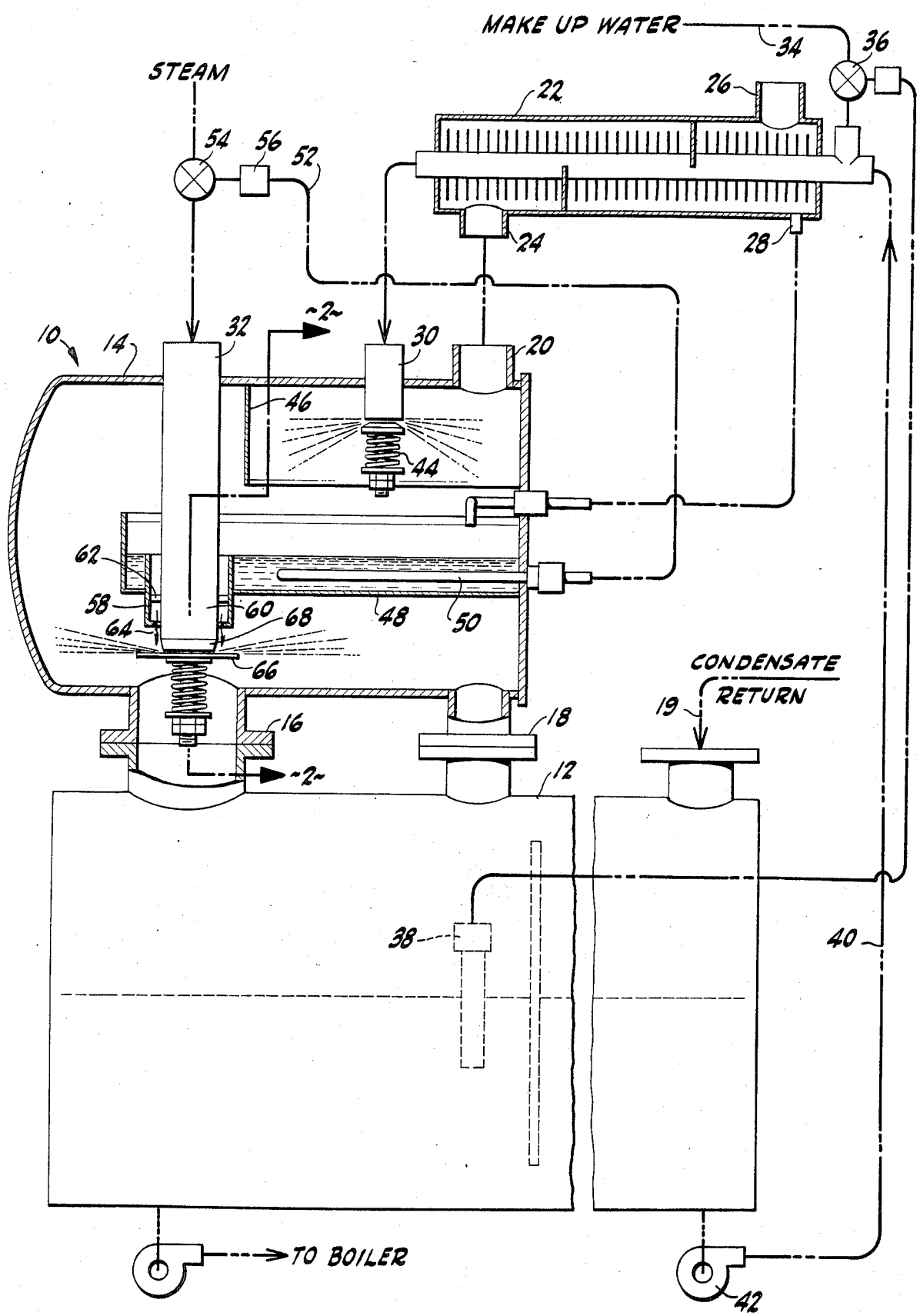
FIG. 1 is a cross sectional view partially schematic, of the deaerator unit with accompanying condenser and receiver.

The deaerator unit 10 is shown in FIG. 1 in combination with a receiver 12 which is a collection tank for deaerated water. Since the deaerator unit 10 is a separate unit from the receiver 12, greater flexibility in sizing is allowed. The relatively small receiver 12 shown is for purposes of example. Since all water collected by the receiver has been scrubbed and deaerated, the materials required for its construction and lining, may have less stringent corrosion specifications, even when the system is used in industrial processing environments. As noted, the deaerator unit 10 of this invention may be contained within a receiver vessel 12, as schematically illustrated in FIG. 4. The externally mounted canister unit is preferred for convenient inspection and servicing. The essential internal operating elements of the novel deaerator unit are enclosed in a vented container comprising either the canister shown or a conventional receiver vessel.

Referring to FIG. 1, the deaerator unit 10 is preferably constructed with a compact canister 14 coupled to the top of the receiver 12 by a pair of flange couplings 16 and 18 forming two communicating passages between the receiver 12 and canister 14. The passages provide for unrestricted passage of steam and drainage of condensate between upper and lower vessels. The two passages aid in free circulation of steam to the receiver to maintain temperatures of deaerated water in the receiver. Deaerated condensate returning from the processing equipment or spent steam condensate from the boiler is returned to the receiver through return line 19.

The canister 14 of the deaerator unit 10 has an unrestricted vent line 20 to atmosphere. Preferably the vent line 20 is connected to heat exchanger 22 of the type described in my application entitled HEAT EXCHANGER, Filed Nov. 18, 1985, Ser. No. 798,923, now U.S. Pat. No. 4,648,355.

The vent connection 24 on the heat exchanger 22 in turn leads to an open air vent 26. On using the counterflow, finned heat exchanger 22, any steam that escapes the deaerator unit 10 is condensed, the condensate being returned by return line 28 to the deaerator unit.

Passing through the canister is a water supply line 30 and a steam supply line 32. Makeup water is supplied through a makeup line 34 having an electrically controlled valve 36 operated by signals generated by a water level sensor 38 immersed in the receiver tank water. The makeup line 34 joins a condensate circulating line 40 through which receiver water is continuously circulated by a small circulating pump 42. The water mixture passes through the heat exchanger 22 where it is raised in temperature, particularly if the admixture includes any significant quantity of low temperature makeup water. The heat exchanger 22 aids in attenuating temperature fluctuations in the water mixture which varies according to processing demands.

The water mixture enters the canister 14 through inlet 30 and is discharged in a fine conical spray by a discharge nozzle 44. The fine spray provides a dynamic barrier to the open vent causing escaping steam to condense, but allowing noncondensible gases to pass. During the condensing process the fine water droplets are raised to just under vaporization temperature, purging the droplets of most of the contained oxygen and carbon dioxide. Any steam that does escape through vent 26 is condensed by the condenser 22 connected to the vent.

As shown in FIGS. 1 and 2, the water spray is contained in the confines of the vent by a shroud 46 fixed to the inner wall of the canister to direct impinging water to a collection tray 48. The collection tray 48 mounted below the shroud 46 provides a temporary reservoir for the collected water so that the water temperature can be measured by a temperature probe 50 having a feedback circuit 52 to an electrically controlled steam valve 54. The controller 56 is set to 211° F., such that a lower temperature sensed will increase the minimal supply of steam to the canister The excess steam in attempting to escape will contact the water spray raising the temperature of the spray and hence the water collected in the tray. The increased temperature is sensed and the steam supply is throttled back to an adjusted volume and eventually to a minimum supply volume necessary to heat and explode cycling condensate.

The water in the collection tray 48 cascades over a concentric overflow dispenser 58 maintained around the steam discharge pipe 60 by web spacer 62 and passes through an inner passage 64 evenly down the discharger pipe 60 to a dispersion plate 66 of a steam atomizing valve 68, where it is violently dispersed by the high velocity steam escaping between the end 70 of the discharge pipe 60 and the plate 66.

The thoroughly deaerated water collects on the walls of the canister and drains from the canister through either of the two passages formed by the flange coupling 16 and 18 to the receiver 12.

The steam atomizing valve 68 is shown in greater detail in FIG. 3. The steam discharge pipe 60 terminates in a carefully machined end 70 which includes an outer bevel and an inner machining to produce a high tolerance concentric end for even dispersal of the water film cascading down the outer surface of the discharge pipe. The dispersion plate 66 is spring biased against an adjustable stop 72 threaded on a central stem 74. The stem is threaded on a core web 76 within the discharge pipe 60. The bias of the plate 66 toward the end of the discharge pipe is produced by a coil compression spring 78 compressed between bushing 80 and 82 by adjustment nut 84 and locknut 86. The plate 66 is displaced a minimal distance from pipe end 70 by stop 72 to initiate uniform peripheral dispersion of steam. Steam is supplied at 5 lbs at the nozzle in a quantity directly related to the temperature of the spray water as measured by the temperature probe. For example to bring spray water having a 150° F. temperature up to the desired scrubbing temperature of 211° F. requires 12,774 cf/hr of steam at 227° F. for 160 cubic feet of water.

The operation of the spray nozzle 44 is similar to the steam atomizing nozzle 68. A small dispersion plate 88 is biased against an internal bevelled end 9 of the water supply line 30 by a compression spring 92 compressed by bushings 94 and an adjustment nut 96 on a stem 98. The dispersion plate and pipe end generate a fine conical spray that is contained by the shroud 46 which dips the impinging water to the underlying collection tray 48 as described. All parts in the deaerator unit are constructed of stainless steel or other like non-corrosive material. By confining the deaerator to a separate component from the receiver as preferred, the receiver is not required to be lined as all water deposited in the receiver is thoroughly deaerated.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In a deaerator system for deaerating boiler feedwater having a deaerator tank with a boiler feedwater line, a condensate return, a makeup water line and a steam source line, the improvement comprising a deaerator unit operable in conjunction with the deaerator tank, the deaerator unit having:
   (a). a container with a vent;
   (b). a structure arranged with said air vent to form a vent confines;
   (c). a water spray nozzle connected to the makeup water line, the spray nozzle constructed to spray water in a fine spray in the confines of the air vent;
   (d). a water spray collection reservoir arranged with the water spray nozzle to collect water sprayed from the nozzle;
   (e). a steam operated water atomizer connected to the steam source line arranged to receive water from the water reservoir for atomization by direct contact by steam from the steam source;
   (f). a water temperature sensor arranged for water submersion in the water reservoir;
   (g). steam supply control means for regulating the volume of steam supplied to said water atomizer according to that required to maintain a relatively constant reservoir water temperature, proximally under the vaporization temperature; wherein steam and noncondensible gases released on spraying and atomizing the water pass to the confines to said vent, steam being condensed and noncondensible gases being passed through said vent.

2. The deaerator unit of claim 1 wherein said deaerator unit is a separate component from the receiver and is connected to the receiver by couplings providing steam and condensate passage from said deaerator unit to said receiver.

3. The deaerator unit of claim 1 wherein said deaerator unit is confined within said receiver in a contained deaerating condenser section of the deaerator.

4. The deaerator unit of claim 1 wherein the deaerator system includes a circulating pump with a feed line connected to the receiver and water spray nozzle for circulating condensate in the receiver to the spray nozzle.

5. The deaerator unit of claim 4 wheein the vent is open to atmosphere.

6. The deaerator unit of claim 5 wherein the deaerator system is an atmospheric deaerator.

7. The deaerator unit of claim 5 in combination with an external condenser connected to said vent for condensing any steam that escapes through the vent.

8. The deaerator unit of claim 1 wherein the collection reservoir is positioned below the vent confines.

9. The deaerator unit of claim 8 wherein the collection reservoir comprises a shallow tray.

10. The deaerator unit of claim 1 wherein said structure arranged with said vent comprises a shroud.

11. The deaerator unit of claim 1 wherein said reservoir includes a water overflow with a conduit to said water atomizer.

12. The deaerator unit of claim 11 wherein said water atomizer includes a steam line with a discharge end, said overflow having a water dispenser circumventing said discharge end of said line and arranged to cascade water from said reservoir along the discharge end of said steam line prior to atomization by contact with said steam.

13. The deaerator unit of claim 12 wherein said steam operated water atomizer includes a spring biased dispersion plate at the end of the steam line, wherein water from said water dispenser is deposited on said dispersion plate and atomized by steam discharged from said steam pipe.

* * * * *